United States Patent
Ando et al.

(10) Patent No.: US 7,679,816 B2
(45) Date of Patent: Mar. 16, 2010

(54) PICTURE DISPLAY UNIT

(75) Inventors: Hiroaki Ando, Aichi-ken (JP); Takeshi Miyazaki, Aichi-ken (JP); Hiromitsu Takeuchi, Aichi-ken (JP); Hiroshi Nakamura, Seto (JP); Masahiko Ishii, Toyota (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 68 days.

(21) Appl. No.: 12/216,738

(22) Filed: Jul. 10, 2008

(65) Prior Publication Data
US 2009/0015905 A1  Jan. 15, 2009

(30) Foreign Application Priority Data
Jul. 13, 2007  (JP) .............................. 2007-184591
Jul. 13, 2007  (JP) .............................. 2007-184606

(51) Int. Cl.
*G02B 26/00*  (2006.01)
(52) U.S. Cl. ...................................... 359/296
(58) Field of Classification Search ................ 359/296; 345/107, 105; 430/32, 34, 38; 204/450, 204/600
See application file for complete search history.

(56) References Cited

U.S. PATENT DOCUMENTS 5,739,946 A * 4/1998 Iwanaga et al. ............. 359/296
6,897,610 B1 * 5/2005 Aoki et al. .................. 313/586

FOREIGN PATENT DOCUMENTS

JP    A-2002-011112    1/2007

OTHER PUBLICATIONS

U.S. Appl. No. 12/216,729, filed Jul. 10, 2008, Ando et al.

* cited by examiner

*Primary Examiner*—Ricky L Mack
*Assistant Examiner*—Tuyen Q Tra
(74) *Attorney, Agent, or Firm*—Posz Law Group, PLC (57) ABSTRACT

A picture display device includes display elements reflecting specific wavelengths of visible light; and shape deformation portions for inducing elastic deformation of the display elements. The individual display elements have colloidal particles arrayed at regular spacing, and an elastically deformable filler material intervening between the colloidal particles. The shape deformation portion includes a shape retention component formed of a material capable of reversible plastic deformation by external force.

7 Claims, 5 Drawing Sheets

PICTURE DISPLAY UNIT

This application claims the benefit of and priority from Japanese Application No. 2007-184591 filed Jul. 13, 2007, and No. 2007-184606 filed Jul. 13, 2007, the contents of which are incorporated herein by reference.

BACKGROUND OF THE INVENTION

1. Field of the Invention

The present invention relates to a picture display device for displaying images through reflection of specific wavelengths of visible light by a periodic structure produced by colloidal particles.

2. Description of the Related Art

Picture display devices of this kind known is disclosed, for example, in JP 2007-11112 A. In the device, the pixels are composed of colloidal crystals filled with polymer gel; absorption and release of a solvent by the polymer gel is brought about through application of electrical voltage to the pixels thereby inducing the colloidal crystals to undergo changes in volume through expansion and contraction. This causes the spacing between the colloidal crystals to change, producing the desired display through reflection of visible light, the wavelength of which reflected light is determined by Bragg's law. However, a drawback of the picture display device is that the colloidal crystals cannot maintain their deformed state unless voltage continues to be applied, so power consumption is considerable.

Another problem is that since the picture display device cannot display black, the content which it is possible to display is limited.

SUMMARY

An advantage of some aspects of the invention is to provide a picture display device able to maintain the picture display even in the absence of external force, and affording reduced energy consumption. Another advantage of some aspects of the invention is to provide a picture display device capable of varied display using reflected light, that can display clearly a background color such as black.

According to an aspect of the invention, the invention is provided with a picture display device which has multiple arrayed display elements that reflect specific wavelengths of visible light; and shape deformation portions for inducing elastic deformation of the display elements. The individual display elements have colloidal particles arrayed at regular spacing and an elastically deformable filler material intervening between the colloidal particles, the display elements being configured to reflect visible light of specific wavelength through variation of the spacing. The shape deformation portion includes a shape retention component that changes the spacing of the display element by multiple levels of displacement in response to external force, and undergoes plastic deformation so as to maintain the displacement.

The picture display device of the present invention includes an arrangement of a plurality of display elements whose picture display changes through reflection of visible light of specific wavelengths. The display elements include colloidal particles arrayed at regular spacing, and a filler material intervening between them. When visible light impinges on these display elements, increased reflectivity will be observed at a specific reflected wavelength λ peak. Specifically, based on Bragg's law and Snell's law, the reflected wavelength λ peak may be expressed by Equation (1) having as a parameter the interplanar spacing d of the (111) crystal planes of the colloidal particles.

$$\lambda\text{peak} = 2d(111)(\text{neff}^2 - \sin^2\theta)^{0.5} \quad (1)$$

λpeak: reflected wavelength
θ: incident angle
d(111): lattice spacing
neff: effective refractive index That is, wavelengths contained in incident visible light can be selectively reflected through differences in interplanar spacing d. Here, the effective refractive index neff is given by Equation (2), from the refractive index of the colloidal particles, the refractive index of the filler material, and the proportions of these materials.

$$\text{neff} = (1-\phi)ns + \phi \cdot nsphere \quad (2)$$

nsphere: reflectivity of colloidal particles
ns: refractive index of filler material
φ: volumetric proportion of colloidal particles By varying the spacing of the colloidal particles in this way it is possible to bring about a shift of the reflected wavelength λ peak of the display elements. According to the present invention, by arranging a plurality of display elements which selectively reflect specific wavelengths of visible light, and by additionally employing shape retention components that undergo plastic deformation when subjected to external force, it will be possible to vary the spacing of the display elements to produce various picture displays. The shape retention component varies displacement of the display element among multiple levels, and undergoes plastic deformation so as to maintain the element at a particular level of displacement so that the spacing of the display element will be maintained even when the external force is released. That is, once a shape retention component has undergone plastic deformation, it will be possible to maintain the display color of the display element without the need for continued application of external force for the purpose of maintaining display color, so that energy savings may be achieved.

The shape retention components are not limited to any particular material provided that it is capable of undergoing plastic deformation upon when subjected to a prescribed minimum level or more of deformation through external force, and of subsequently maintaining that shape; examples are room-temperature plastic elastomers, thermoplastic polymers, shape memory polymers, or soft metals such as aluminum (Al) having a polymer-coated surface. Possible means for applying external force to the shape retention components include designs whereby mechanical force is applied to the shape retention components; and designs furnished with deformation actuation portions for applying external force to the shape retention components through an electrical signal. Such means may be designed to be detachably attachable to or integrally incorporated into the shape retention components.

In a preferred embodiment, the deformation actuation portions will be provided in association with individual display elements, and will have a design which includes an actuating element for applying actuating force to bring about plastic deformation of the shape retention components so as to vary the spacing of the display elements, and for bringing about plastic deformation so as to restore the components to their original positions. Employing such a design, it will be possible to easily restore plastic deformation of the shape retention components back to the original condition, and to change the picture display through a simple arrangement.

The colloidal particles employed herein are not limited to any particular material provided that it can transmit Bragg reflected light and is substantially spherical in shape; examples include silicon dioxide ($SiO_2$), borosilicate glass, calcium aluminate, lithium niobate, calcite, titanium oxide ($TiO_2$), strontium titanate, aluminum oxide, lithium fluoride, magnesium fluoride, yttrium oxide, calcium fluoride, barium fluoride, zinc selenide, thallium bromoiodide, diamond, and the like. It is also possible to use a ferroelectric body such as lead zirconate titanate (PZT) or lead lanthanum zirconate titanate (PLZT); polyethylene, polyethylene terephthalate, vinyl chloride, acrylic, vinyl oxide, polystyrene, polypropylene, or poly(methyl methacrylate); or silicon or germanium. It is further possible to use a mixture of any two or more compounds selected from polystyrene, poly(methyl methacrylate), $SiO_2$, and $TiO_2$; or a material of core-shell structure having one of these compounds as the core sheathed by a shell of one or more of the other compounds. The regularity of arrangement of the colloidal particles is not limited to any particular form, examples being face-centered cubic, body-centered cubic, simple cubic, or the like, and especially the face-centered cubic structure, i.e. the hexagonal close packed structure. While the spacing of the colloidal particles will be dependent on the rate of expansion of the filler material, it is necessary that, with the filler in the expanded state, wavelengths reflected based on Bragg's law will lie in the infrared region.

According to an aspect of another invention is provided a picture display device which has multiple arrayed display elements that reflect specific wavelengths of visible light; and shape deformation portions for inducing elastic deformation of the display elements. The individual display elements have colloidal particles arrayed at regular spacing and an elastically deformable filler material intervening between the colloidal particles, the display elements being configured to reflect visible light of specific wavelength through variation of the spacing. The shape deformation portion includes a shape retention component that changes spacing of the display element by multiple levels of displacement in response to external force, and undergoes plastic deformation so as to maintain the displacement.

In display elements of such a design, the reflected wavelength λ peak can be varied by changing the colloidal particle spacing. According to the present invention, a plurality of display elements which selectively reflect specific wavelengths of visible light are arrayed; and picture displays can be produced by changing the spacing of the display elements, carried out by deformation actuation portions of shape deformation portions. Specifically, when a deformation actuation portion sets a display element to a first displacement, that display element will not exhibit a peak value of reflected wavelength in the visible light region, and therefore visible light will be transmitted through the display elements and be reflected by a colored portion so that the prescribed color of the colored portion is displayed. When a deformation actuation portion sets a display element to a second displacement, a specific reflected wavelength of light in the visible light region will be reflected, and the color of the reflected wavelength will be displayed. Thus, by setting displacement of individual display elements, the picture display device can display various images.

Here, the color of the colored portions can be set in various ways, such as a single color or a pattern. In the case of black color, it will now be possible for display elements to display black, which could not be displayed with conventional technologies.

In a preferred embodiment of the picture display device, a pressure plate for applying pressure for uniform spacing of the display element will be interposed between the display element and the actuating element; and a design whereby the colored portion is integrally furnished to the pressure plate is possible. With such a design, it will be possible for the display element to be uniformly compressed by the pressure plate, as well as facilitating placement of the colored portion.

Herein, particle size of the colloidal particles can be a value whereby the particles, while arrayed in a regularly spaced condition, can assume either a visible light transmitting condition or a condition of reflecting a specific wavelength; for example, colloidal particle size will preferably be between no more than 80 and 150 nm. This is because sizes below 80 nm do not exhibit reflected wavelengths in the visible light region, while sizes in excess of 150 nm have reduced transmittance of visible light. The filler material will preferably be an elastomer capable of changing the spacing of the colloidal particles in response to external force; for example, an acrylic elastomer, a silicone elastomer, polymethyl methacrylate (PMMA), hydroxyethyl methacrylate (HEMA), or the like could be used.

These and other objects, features, aspects, and advantages of the present invention will become more apparent from the following detailed description of the preferred embodiments with the accompanying drawings.

DESCRIPTION OF THE PREFERRED EMBODIMENTS

The preferred modes for carrying out the present invention will be discussed below.

(1) General Configuration of Picture Display Device 10

Figure 1:
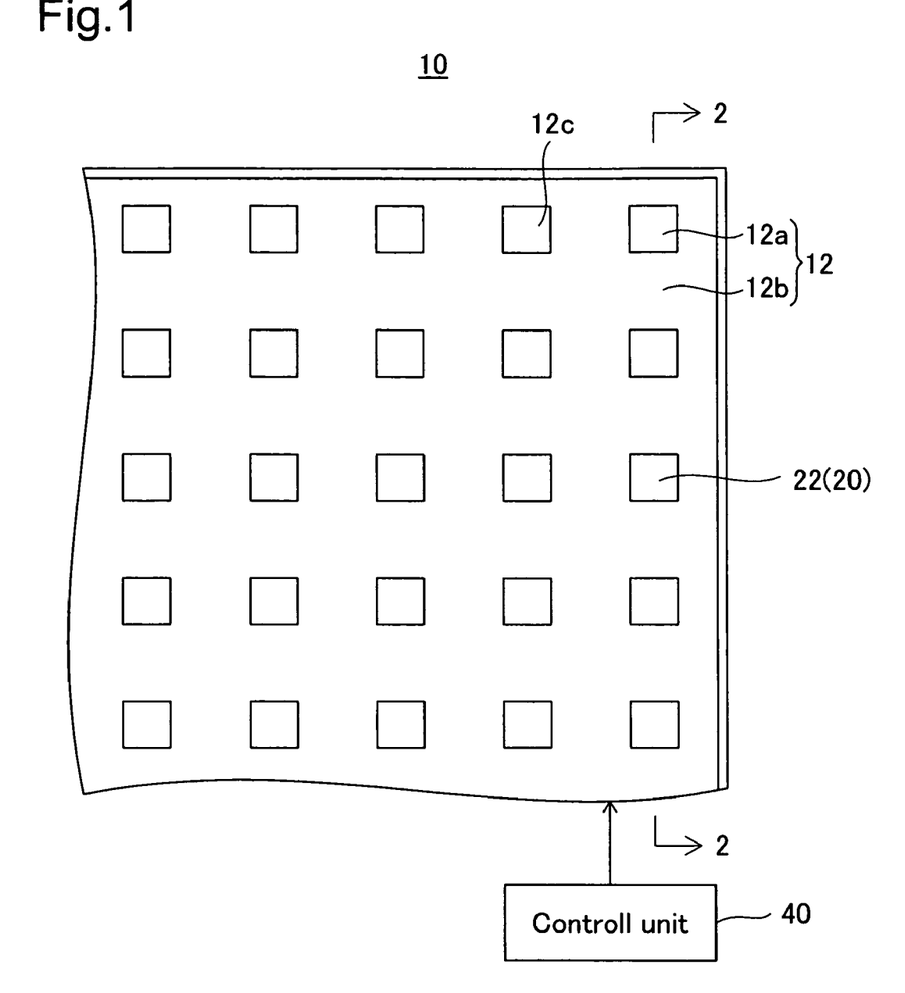
FIG. 1 is a plan view showing a picture display device which pertains to a first embodiment of the present invention.
Figure 2:
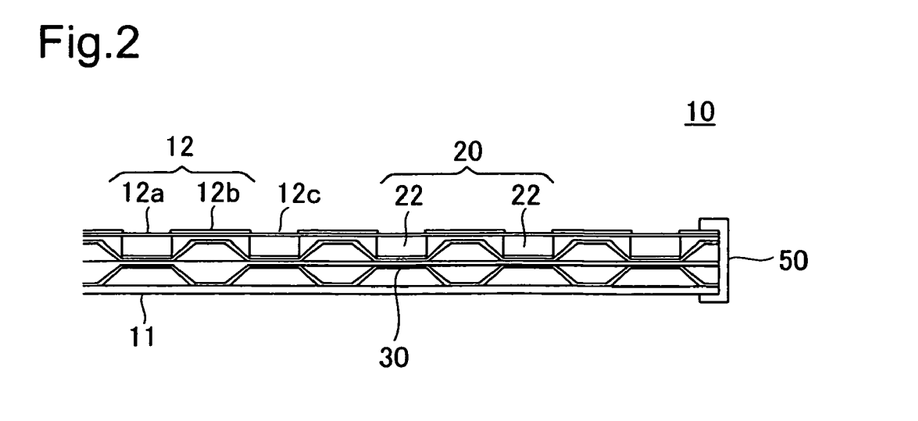
FIG. 2 is a sectional view taken along line 2-2 in FIG. 1.

FIG. 1 is a plan view showing a picture display device 10 which pertain s to a first embodiment of the present invention; and FIG. 2 is a sectional view taken along line 2-2 in FIG. 1. In FIG. 2, the picture display device 10 includes a support substrate 11; a display panel 12 arranged parallel to the support substrate 11 with a prescribed gap therebetween; a display mechanism 20 positioned between the support substrate 11 and the display panel 12 and composed of a multitude of display elements 22; shape deformation portions 30 for applying force in order to bring about deformation of the display elements 22 of the display mechanism 20; a control unit 40 (FIG. 1) which outputs an actuation signal to the shape deformation portions 30; and a frame body 50 positioned bordering the sides of the display mechanism 20. In the design of this picture display device 10, the control unit 40 outputs actuating signals to the shape deformation portions 30 which then induce shape change in the display elements 22 of the display mechanism 20, setting the reflected wavelength of the display elements 22 to produce varied displays. The design of individual components of the picture display device 10 will be described below.

(2) Design of Components of Picture Display Device 10

The support substrate 11 is a component for supporting the display mechanism 20, and is formed by a printed circuit board or the like. The display panel 12 includes a transparent substrate 12a formed of a glass panel or transparent resin capable of transmitting visible light; and masking 12b which has been formed on the outside face of the transparent substrate 12a. As shown in FIG. 1, square windows 12c arrayed in two dimensions are formed in the masking 12b. Each of the windows 12c is 5 mm×5 mm in size, and they arranged in an 8×8 pattern.

Figure 3:
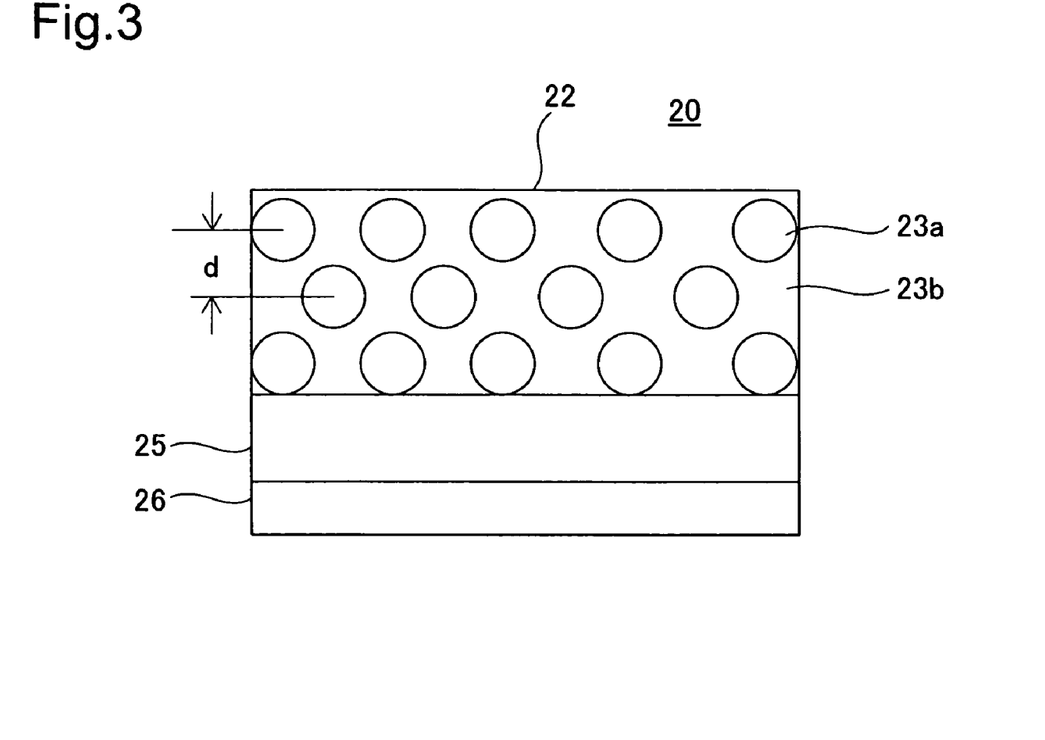
FIG. 3 is an enlarged view showing part of a display mechanism.
Figure 4:
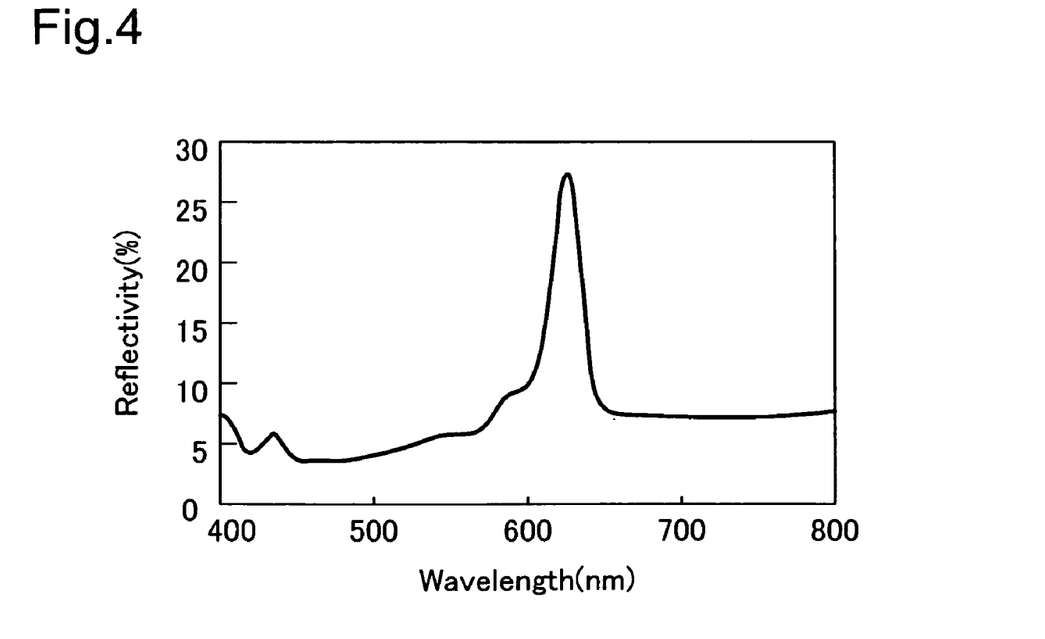
FIG. 4 illustrates the relationship of display mechanism wavelength to reflectivity.

FIG. 3 is an enlarged view showing part of the display mechanism 20. The display mechanism 20 includes the display elements 22 composed of a plurality of cells arranged in a two-dimensional pattern; and pressure plates 25 attached at the lower face of the display elements 22. Each display element 22 is composed of colloidal particles 23a and a filler material 23b which fills the space between the colloidal particles 23a. The colloidal particles 23a are arranged at locations similar to the lattice locations in a closed packed structure, but the filler material 23b is present between neighboring colloidal particles 23a so the colloidal particles 23a do not contact one another. The colloidal particles 23a are $SiO_2$ particles 80 nm in size, for example. The filler material 23b is composed of a mixture of a first resin material (polyethylene glycol #600 diacrylate; NK ESTER A-600 (™) made by Shin-Nakamura Chemical) and a second resin material (methoxy polyethylene glycol #400 acrylate; NK ESTER AM-90G (™) made by Shin-Nakamura Chemical), with the proportions being between 1:4 and 1:19. The colloidal particles 23a are included in a proportion of 6 wt % versus 15 wt % of the filler material 23b. Where such a parameter is selected, with the colloidal crystals in the non-deformed condition, the spacing d(111) at the (111) crystal faces of the colloidal particles will be 230 nm, and as shown in FIG. 4 the peak value of reflected wavelength will appear at the red wavelength so that red can be displayed. The discussion herein above shows an example of colloidal crystals; through appropriate selection of material and size of the colloidal particles and of the material of the filler it would be possible also to produce colloidal crystals in the non-deformed condition will reflect infrared rays and transmit visible light. Such colloidal crystals will become transparent when in the non-deformed condition, and will be able to display the pressure plates situated at the lower face of the colloidal crystals.

The pressure plate 25 is composed of a transparent plate positioned in intimate contact against and unified with the lower face of the display element 22; in response to stress from the shape deformation portion 30 (FIG. 2) it will compress the display element 22 with uniform force. At the lower face of the pressure plate 25, a colored portion 26 to which black color has been applied is integrally formed with the pressure plate 25.

Figure 5:
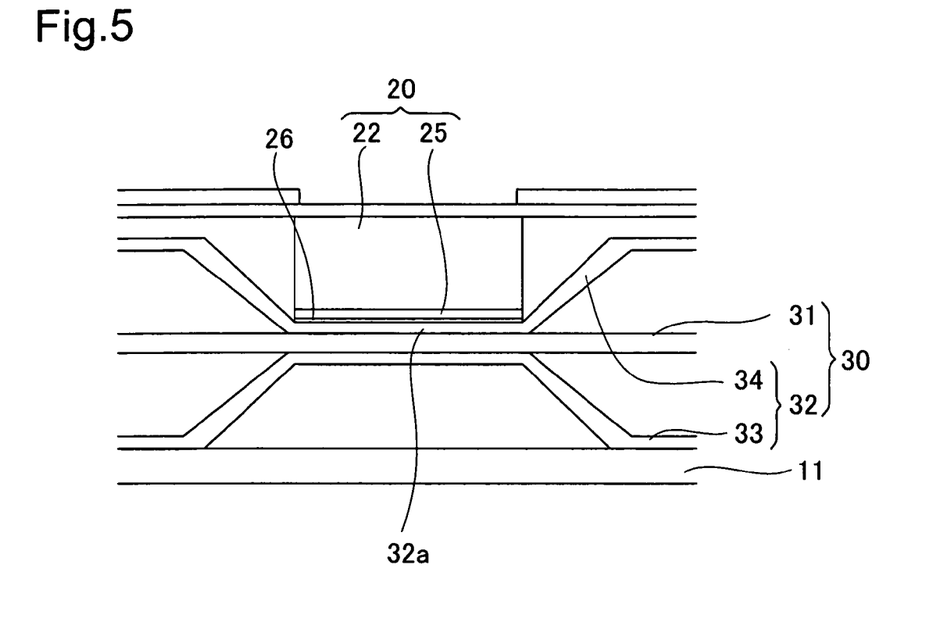
FIG. 5 is an enlarged view of a shape deformation portion.
Figure 6:
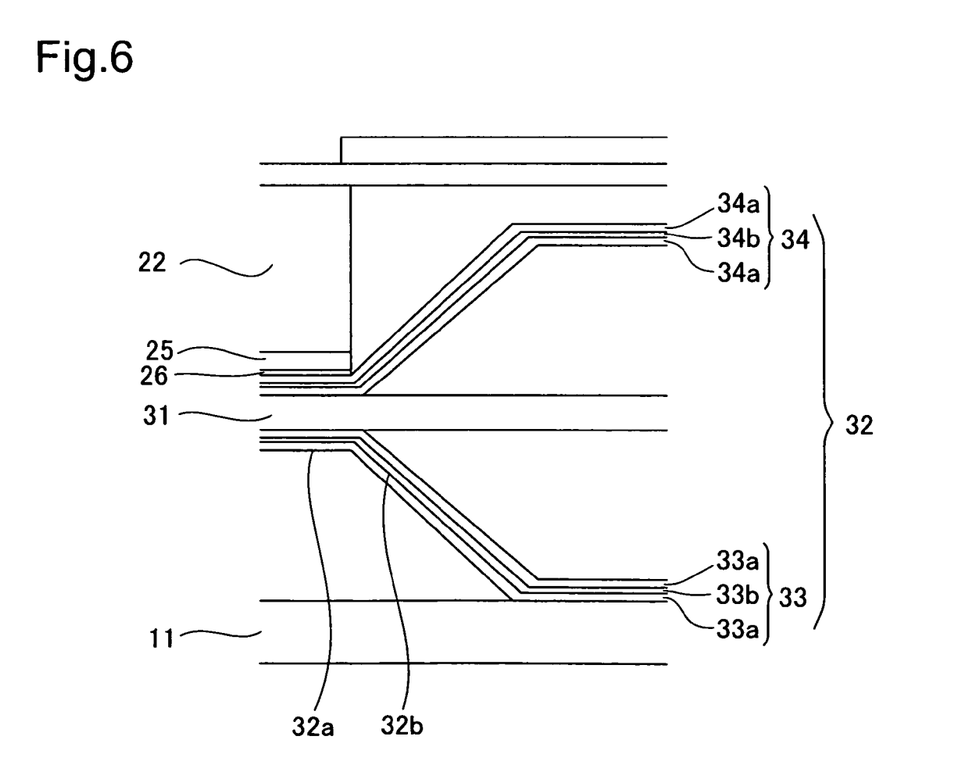
FIG. 6 depicts the vicinity of a deformation actuation portion.

FIG. 5 is an enlarged view of the shape deformation portion 30. The shape deformation portion 30 includes a shape retention component 31; a deformation actuation portion 32 arranged sandwiching the shape retention component 31; and a line (not shown) leading from the control unit 40 (FIG. 1) for the purpose of transmitting an electrical signal to the deformation actuation portion 32. The shape retention component 31 can employ a room-temperature plastic elastomer (e.g. the elastomer disclosed in JP 2004-075873 A) that through plastic deformation will maintain the shape of the display element 22. FIG. 6 depicts the vicinity of the deformation actuation portion 32. The deformation actuation portion 32 includes a first actuation component 33 which is supported on the support substrate 11, and a second actuation component 34 which, together with the first actuation component 33, sandwiches the shape retention component 31, thereby constituting an actuating element 32b having a pressure portion 32a of convex shape situated at a location on the pressure plate 25 which corresponds to an individual display element 22. The first actuation component 33 is composed of a dielectric elastomer 33b (e.g. acrylic rubber or silicone rubber) sandwiched by two electrodes 33a, 33a. Owing to the design of the first actuation component 33, when voltage is applied across the electrodes 33a, 33a, positive charge will build up at one electrode while negative charge will build up at the other electrode, producing attracting force across the electrodes 33a, 33a; due to this force the dielectric elastomer 33b will flatten out and expand in a planar direction. This results in the patterned indented morphology of the deformation actuation portion 32 becoming taller, which causes the shape retention component 31 to deform, as well as inducing elastic deformation of the display element 22 via the pressure plate 25. The second actuation component 34 is similar in design to the first actuation component 33, that is, a dielectric elastomer 34b is sandwiched by electrodes 34a, 34a, and through application of voltage to the electrodes 34a, 34a will move in the direction away from the pressure plate 25, inducing deformation of the shape retention component 31 in such a way as to relieve the elastic compressive force on the display element 22.

The control unit 40 sends signals over lines in a grid pattern corresponding to the individual actuating elements 32 of the deformation actuation portion 32, whereby the individual display elements 22 are controlled independently.

(3) Display Operation of Picture Display Device 10

Figure 7A:
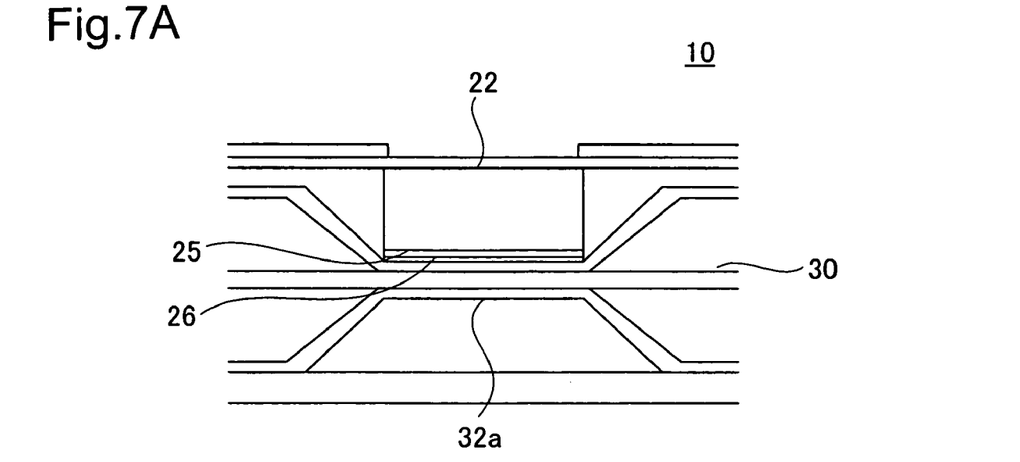
FIGS. 7A through to 7C illustrate operation of the picture display device.

FIG. 7 illustrates operation of the picture display device 10. The picture display device 10 changes the display by maintaining or changing the shape of the individual display elements 22 on the basis of signals sent by the control unit 40 to the shape deformation portions 30. Specifically, in the event that the control unit 40 (FIG. 1) outputs a signal of 0 V level (a signal corresponding to a first displacement) to the actuating element 32b of a shape deformation portion 30, the display element 22 will not become deformed by the actuating element 32b (the condition depicted in FIG. 7A). In this condition the display element 22 is a transparent body that transmits visible light, and since its spacing is such that the peak value which satisfies the Bragg condition does not appear in the visible light range, visible light will pass through the pressure plate 25 and become absorbed by the colored portion 26 so that the black color of the colored portion 26 will be displayed without change.

Figure 7B:
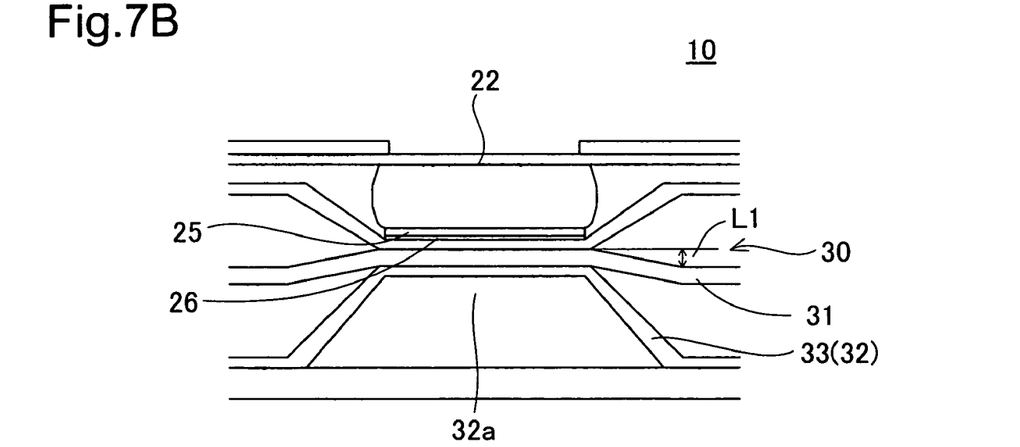
FIGS. 8A through 7B illustrate operation of the picture display device.
Figure 7C:
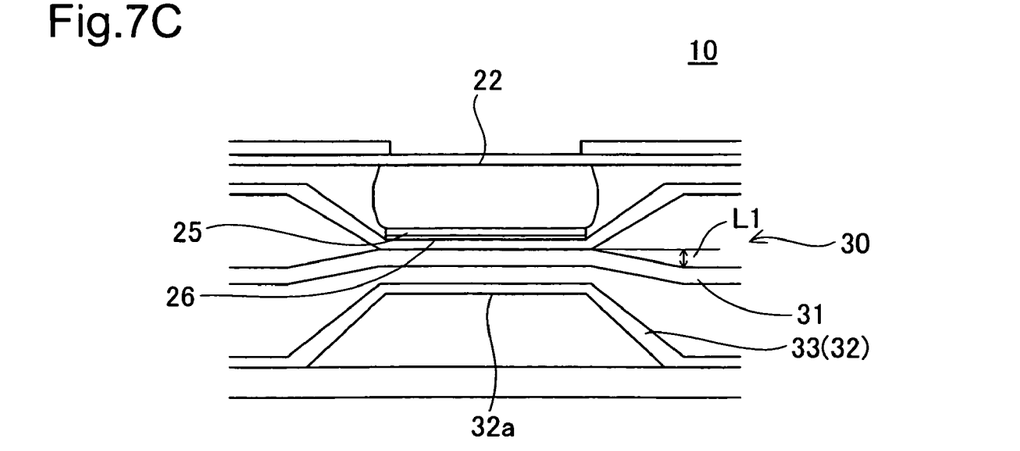

Meanwhile, in the event that the control unit 40 outputs a signal of a different level (a signal corresponding to a second displacement) to the actuating element 32b of a shape deformation portion 30, the dielectric elastomer 33b of the first actuation component 33 of the deformation actuation portion 32 will deform, and the shape retention component 31 will undergo plastic deformation conforming to the convex shape of the dielectric elastomer 33b. The shape retention component 31 will then compress the display element 22 via the pressure plate 25 and induce elastic deformation by a level of displacement L1 (the condition depicted in FIG. 7B). Thus, the spacing of the colloidal particles 23a in the display element 22 will change, the reflected wavelength associated with that spacing will shift, and visible light of the reflected wavelength determined by the new spacing will be reflected so that the corresponding color is displayed. As shown in FIG. 7C, even when the control unit 40 now outputs a signal of 0 V level to the actuating element 32b of the shape deformation portion 30, that is, voltage ceases to be applied to the actuating element 32b and one side of the deformation actuation portion 32 returns to its original state, the shape retention component 31 will maintain the level of displacement L1, and consequently the display element 22 will continue to be maintained in a state of elastic deformation. Thus, the display of the display element 22 will be unchanged.

Figure 8A:
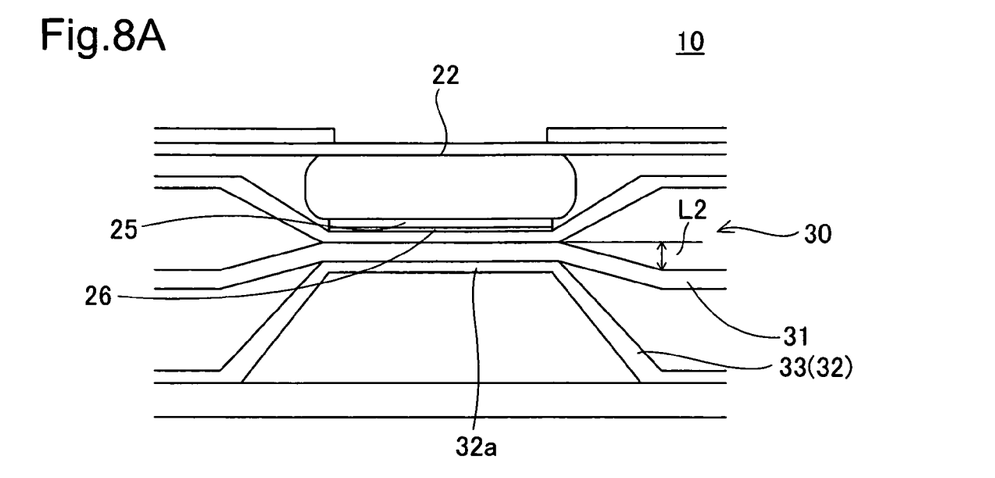
Figure 8B:
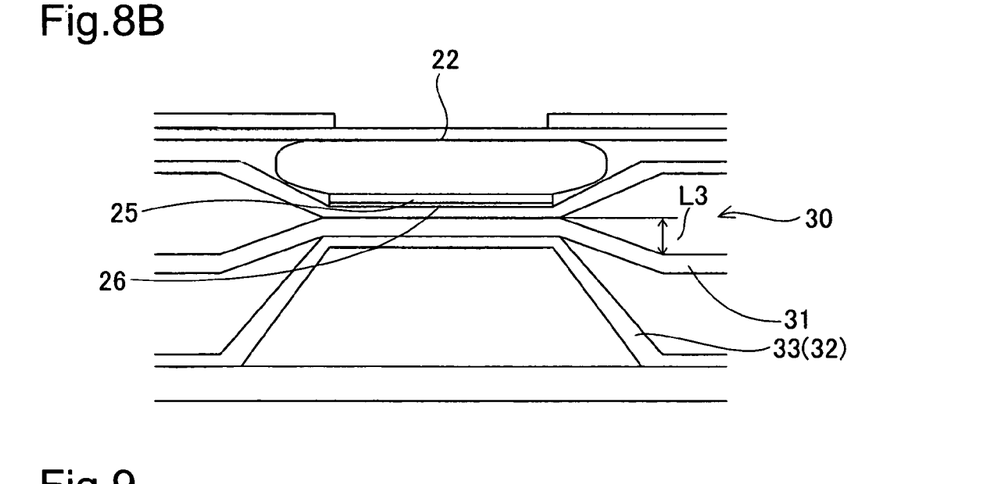

Through display control in this way, the display of the display elements 22 can be changed in various ways by varying the level of the signals which are output by the control unit 40. Specifically, if the level of displacement L1 of the display element 22 is small and the spacing is large as depicted in FIG. 7B and 7C, the peak value of reflected wavelength will appear at red wavelength; whereas if there is a greater level of displacement L2 of the display element 22 as depicted in FIG. 8A the peak value of reflected wavelength will appear at green wavelength, and if there is an even greater level of displacement L3 of the display element 22 as depicted in FIG. 8B the peak value of reflected wavelength will appear at blue wavelength. For example, where the display element 22 has thickness of 0.01 mm, it will be transparent and the black color of the colored portion will be displayed; whereas if the thickness is 0.005 mm, 0.007 mm, or 0.009 mm, blue, green, or red color will be respectively displayed, returning to a transparent state at 0.003 mm. White color can be displayed by the display elements 22 through the use of sets of three adjacent display elements to produce reflected wavelengths of the three primary colors.

(4) Picture Display Device 10 Production Process

Next, a process for making the display mechanism 20 will be described. The display mechanism 20 can be produced using known processes, such as through the following steps for example. First, a solvent for forming the filler material is prepared. The solvent is obtained by mixing a first resin material with a second resin material so as to prepare a 15 wt % aqueous solution. The mixture ratio of the first resin material to the second resin material is 1:9. The first resin material is added for the purpose of accelerating the ultraviolet curing reaction of the second resin material through radical polymerization. Next, $SiO_2$ particles of 80 nm particle size constituting the solute are added to the solvent in an amount of 6 wt % based on the final colloidal dispersion. Next, as the solution undergoes ultrasound stirring, an ultraviolet curing initiator (DAROCUR 1173 (™) made by Ciba Specialty Chemicals) is added at a level of 2 wt % based on the resin weight. A colloidal dispersion is obtained thereby.

Next, the colloidal dispersion is applied to a thickness of between 0.01 and 1 mm onto the transparent substrate 12a; a mask is applied except in the areas that will form the display elements 22; and ultraviolet rays are then directed onto the mask. Curing the film with ultraviolet rays in this way forms display elements 22 in which the colloidal particles are held within the filler material. The colloidal particles will become arrayed in an autonomous and ordered manner thereby. Portions of the film that were masked and not exposed to the ultraviolet rays are then stripped with a solvent to produce the display elements 22. To produce the pressure plates 25 and the colored portions 26, using a process similar to that for forming the display elements 22, a film is deposited, and film formation is carried out in prescribed regions only through a mask. The display mechanism 20 can be formed through this process.

(5) Operation and Working Effects of Picture Display Device 10

(5)-1 Since the display elements 22 of the picture display device 10 utilize colloidal particles, it is possible as a general rule to reflect visible light with 100% efficiency, producing a bright picture display.

(5)-2 By designing the shape deformation portions 30 to produce any desired level of displacement when they compress the display elements 22 in order to vary the reflected wavelength, the display elements 22 can be made to display any desired color.

(5)-3 With the display elements 22 displaced to a condition whereby they transmit visible light, the transmitted visible light can be reflected by the colored portions 26, making possible display of black color, which could not be displayed with conventional technologies.

(5)-4 White color can be displayed by the picture display device 10 by combining the display elements 22 into sets of three adjacent elements, and producing reflected wavelengths of the three primary colors.

(5)-5 The display panel 12 undergoes masking 12b corresponding to the display elements 22, and since the masking 12b will conceal any portions of the display elements 22 which have spread out in the planar direction, color impurities and color leakage from the display elements 22 in the concealed portions will be reduced, and sharp images will be obtained.

(5)-6 The pressure plate 25 uniformly transmits pressing force from the shape deformation portion 30 to the display element 22, pressing it so as to produce a uniform gap throughout the entire display element 22 and thereby reducing the occurrence of partial changes in reflected wavelength so that sharp images will be obtained.

(5)-7 The shape retention component 31 of the shape deformation portion 30 undergoes plastic deformation under external force, and thus the gap of the display element 22 will be maintained even after the external force is released. Thus, once the shape retention component 31 has undergone plastic deformation, the display element can maintain its display color without the need for continued application of external force to maintain display color, thus affording energy savings.

(6) The present invention is not limited to the embodiments provided herein for illustration, and various modifications such as the following can be made without departing from the scope of the invention.

Figure 9:
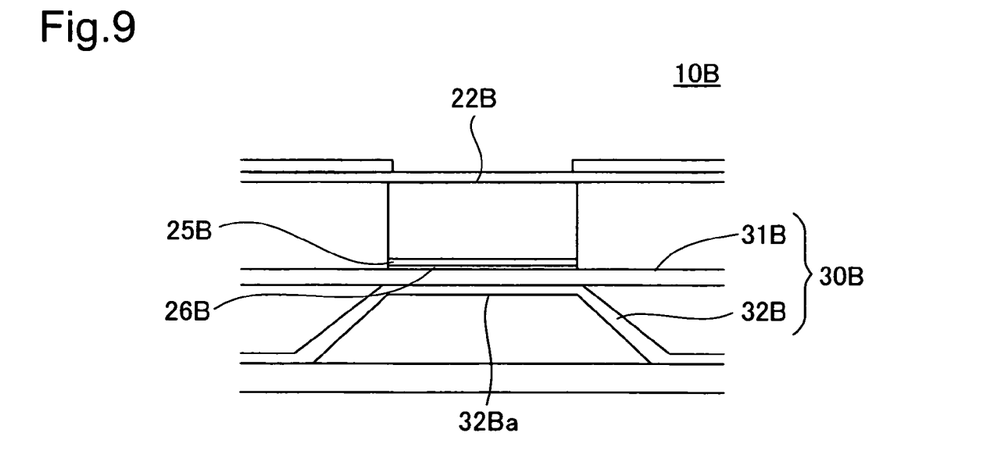
FIG. 9 is a sectional view employing a shape deformation portion pertaining to another embodiment.

(6)-1 FIG. 9 is a sectional view depicting a picture display device 10B according to another embodiment. This embodiment features a design for an deformation actuation portion 32B which induces reversible plastic deformation of a shape retention component 31B through application of force in one direction and of heat. Specifically, the shape deformation portion 30B includes the shape retention component 31B, which here consists of a shape memory polymer that remembers a prescribed shape according to temperature; the deformation actuation portion 32B, which has a pressure portion 32Ba of convex shape disposed in contact against the shape retention component 31B; and a heater (not shown) for heating the pressure portion 32Ba of the shape retention component 31B. The deformation actuation portion 32B deforms through voltage applied to a dielectric elastomer. Owing to the design of the shape deformation portion 30B according to this embodiment, by applying voltage to the deformation actuation portion 32B to bring about deformation of the pressure portion 32Ba, plastic deformation of the shape retention component 31B will be induced via a colored portion 26B and a pressure plate 25B; meanwhile, the original shape can be restored by heating of the pressure portion 32Ba by the heater. The color display of individual display elements 22B can be varied thereby.

(6)-2 The deformation actuation portion can take any of various forms provided that it is capable of producing actuating force sufficient to induce plastic deformation of the shape retention component 31, examples being designs that utilize magnetic force, compressed air, liquid crystal elastomers, dielectric elastomers, piezo elements, ionic dielectric polymer actuators, electrically conductive actuators, polymer gels, and so on.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A picture display device which has (i) multiple arrayed display elements that reflect specific wavelengths of visible light; and (ii) a shape deformation portion for inducing elastic deformation of the display elements, wherein
    each of the individual display elements has (i) colloidal particles arrayed at regular spacing and (ii) an elastically deformable filler material intervening between the colloidal particles, the display elements being configured to reflect visible light of specific wavelength through variation of the spacing; and
    the shape deformation portion includes a shape retention component that changes spacing of the display element by multiple displacement levels in response to external force, and undergoes plastic deformation so as to maintain each of the displacement levels.

2. The picture display device in accordance with claim 1, wherein
    the shape deformation portion includes a deformation actuation portion for imparting the external force to the shape retention component.

3. The picture display device in accordance with claim 2, wherein
    the deformation actuation portion has actuating elements provided in association with the display elements respectively, the actuating elements being configured to bring about reversible plastic deformation of the shape retention component in response to an electrical signal.

4. The picture display device in accordance with claim 3, further comprising a pressure plate that is disposed intervening between the display element and the actuating element, and uniform presses the gap of the display element.

5. A picture display device that reflects specific wavelengths of visible light for displaying of images, the device comprising:
    display elements that have (i) colloidal particles arrayed at regular spacing and (ii) an elastically deformable filler material intervening between the colloidal particles, the display elements being configured to reflect visible light of specific wavelength through variation of the spacing;
    a shape deformation portion that has deformation actuation portions provided in association with the individual display elements respectively, the deformation actuation portions being configured to induce elastic deformation of the corresponding display elements respectively; and
    a colored portion positioned at a location impinged upon by light transmitted through the display elements, and having prescribed color applied thereto,
    wherein the deformation actuation portions are configured to be settable to a first displacement and a second displacement, the first displacement being a position that the display element transmits visible light and displays the prescribed color of the colored portion, the second displacement being a position that is different from the first displacement and the reflected wavelength in the visible light region changes in response to displacement of the display element.

6. The picture display device in accordance with claim 5, wherein the prescribed color of the colored portion is black.

7. The picture display device in accordance with claim 5, further comprising a pressure plate that is disposed intervening between the display element and the actuating element, and uniform presses the gap of the display element, the pressure plate being integrally disposed on the colored portion.

* * * * *